United States Patent Office 3,637,843
Patented Jan. 25, 1972

3,637,843
SYNTHESIS OF DICYANOFORMAMIDES HAVING AN AROMATIC ORGANIC MOIETY
Tad L. Patton, Baytown, Tex., assignor to Esso Research and Engineering Company
No Drawing. Filed Nov. 24, 1967, Ser. No. 685,288
Int. Cl. C07c *125/08*
U.S. Cl. 260—545 R     4 Claims

ABSTRACT OF THE DISCLOSURE

Dicyanoformamides having aromatic moieties as novel composition of matter are prepared by the reaction of a diisocyanate having an aromatic moiety with two (2) moles of hydrogen cyanide in the presence of a catalyst which will not promote further polymerization.

BACKGROUND OF THE INVENTION

The present invention is directed to the synthesis of dicyanoformamides having the following structure:

$$NC-\overset{O}{\underset{\|}{C}}-\overset{H}{\underset{|}{N}}-R-\overset{H}{\underset{|}{N}}-\overset{O}{\underset{\|}{C}}-CN$$

where: R is the organic moiety of the diisocyanate from which the dicyanoformamide is produced and is aromatic, alkyl substituted aromatic, or functionally substituted derivatives thereof.

It has been disclosed by S. Petersen in Annalen der Chemie 562, 205–226 (1949) that a hexamethylene dicyanoformamide is formed by the reaction of hydrogen cyanide with hexamethylene diisocyanate. There is no disclosure, however, of the formation of dicyanoformamides having an aromatic moiety as set forth above. Further, the procedure set forth by S. Petersen in making the aliphatic dicyanoformamides cannot be used to produce a dicyanoformamide having an aromatic moiety.

SUMMARY OF THE INVENTION

New dicyanoformamides having an aromatic moiety are prepared by the reaction of a diisocyanate having an aromatic moiety with two (2) moles of hydrogen cyanide in the presence of an effective catalyst. It has been found that aromatic diisocyanates are much more reactive than aliphatic diisocyanates with hydrogen cyanide. Thus, to form the hydrogen cyanide adduct or dicyanoformamides of the present invention it has been found that the reaction procedure which includes the reaction conditions, is critical. Hydrogen cyanide adds to a diisocyanate by the following reaction:

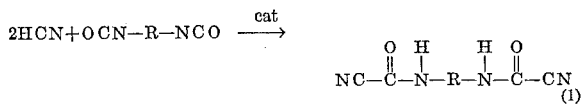

However, another reaction may also occur:

$$HCN + OCN-R-NCO \xrightarrow{cat} \text{Polymer} \quad (2)$$

DESCRIPTION OF THE PREFERRED EMBODIMENTS

The dicyanoformamides of the present invention are produced from diisocyanates having the following structure:

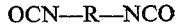

where: R is the organic moiety of the diisocyanate from which the dicyanoformamide is produced and is aromatic, alkyl substituted aromatic and functionally substituted derivative thereof.

The organic moieties of the diisocyanates may be substituted with functional groups such as sulfoxy, sulfonyl, alkoxy, aryloxy, ester, alkylthio, arylthio, nitro and the like which do not react with the isocyanate group or with HCN. Functional groups which have active hydrogen atoms (i.e., carboxylic acids, phenols, amines, etc.) should not be present.

Diisocyanates characterized by having aromatic hydrocarbon moieties are exemplified by m-phenylene diisocyanate; p-phenylene diisocyanate; biphenylene diisocyanate; 1,5-naphthalene diisocyanate and the like. The diisocyanates having an alkyl substituted aromatic hydrocarbon moiety are exemplified by toluene diisocyanate; durene diisocyanates; 4,4'-diphenylmethane diisocyanate; 3,3'-dimethyl-4,4'-biphenylene diisocyanate; 4,4' - diphenylisopropylidene diisocyanate and the like. Further, diisocyanates which have the organic moiety functionally substituted may also be used and are exemplified by 4,4'-diphenylsulfone diisocyanate; 4,4'-diphenyl ether diisocyanate; 3,3'-dimethoxy-4,4'-biphenylene diisocyanate and the like.

The formation of the dicyanoformamide involves the addition of two (2) moles of hydrogen cyanide to each mole of diisocyanate. A slight excess of the required quantity of HCN is preferably used in the reaction. As illustrated by reaction (1) above, a catalyst is required. However, the choice of catalysts is critical so that only reaction (1) is promoted. It has been found that a catalyst such as pyridine will promote both reaction (1) and (2) above when the organic moiety of the diisocyanate is aromatic. Suitable catalysts for promoting the addition of hydrogen cyanide to a diisocyanate having an aromatic moiety to form the corresponding dicyanoformamide have been found to be basic nitrogen-containing compounds which are hindered and of low basicity such as 2,6-lutidine, N,N-dimethylaniline, 2,6-diethylpyridine, and the like.

The reaction of the diisocyanate with hydrogen cyanide is carried out in a suitable solvent so as to better control the reaction. Suitable solvents are benzene, toluene, xylene, ethylbenzene, and the like and mixtures thereof with aliphatic hydrocarbons such as hexane, petroleum ether and the like.

The reaction of a diisocyanate with hydrogen cyanide is exothermic, and further, the polymer forming reaction (2) is promoted by increased temperature. Accordingly, to produce the dicyanoformamides of the present invention it is necessary to maintain the temperature at less than 25° C. Temperatures of between −10° and 25° C. may be used; however, the reaction solution is maintained preferably between 0° and 15° C.

The dicyanoformamides of the present invention and their preparation are illustrated by the following examples which are set forth for illustration and are not to be considered limiting of the invention.

Example 1

A solution of 21 grams (0.75 mole) of hydrogen cyanide and 85 grams of dry toluene and 10 grams of 2,6-lutidine was prepared at ice bath temperatures. To the solution, 62.5 grams (0.25 mole) of 4,4'-diphenylmethane diisocyanate in 135 grams of dry toluene was added dropwise over a period of two hours. While keeping the temperature below 10° C., a solid began to come out of solution. The reaction solution was stirred an additional 30 minutes after completion of the addition. The product (76 grams) was collected on a filter. The product was purified by dissolving it in acetone and filtering the solution into petroleum ether. The pure product melted at 208° C.

*Analysis.*—Calculated for $C_{17}H_{12}N_4O_2$ (percent): C, 67.10; H, 3.97; N, 18.41. Found (percent): C, 66.98; H, 4.22; N, 18.20.

The product has a structure as follows:

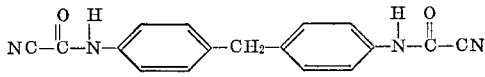

The nuclear magnetic resonance spectrum and the infrared spectrum of the product agreed with the above structure.

Example 2

A solution of 34 grams (1.25 moles) of dry hydrogen cyanide, 12 grams of 2,6-lutidine, and 130 grams of toluene was added to a solution of 80 grams (0.32 mole) of 4,4'-diphenylmethane diisocyanate in 300 ml. of dry toluene at 5° C. The solution was allowed to warm slowly to room temperature and an insoluble product was collected on a filter. The infrared spectrum of the product exhibited absorption maxima at 3.05 and 5.90 microns and was identical to the spectrum of the product in Example 1.

The dicyanoformamides of the present invention are useful as monomers in producing a heterocyclic polymer formed by the reaction of the dicyanoformamide with diisocyanates. Further, the dicyanoformamides of the present invention are useful intermediates in reactions with monoisocyanates to form a wide variety of products.

The nature and objects of the present invention having been completely described and illustrated, what I wish to claim as new and useful and secure by Letters Patent is:

1. A process for producing an aromatic dicyanoformamide having the formula

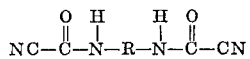

wherein:

R is an unsubstituted aromatic hydrocarbon, an alkyl substituted aromatic hydrocarbon or a functionally substituted aromatic hydrocarbon free of functional groups which contain active hydrogens which comprises:

reacting two moles of hydrogen cyanide with one mole of an aromatic diisocyanate in the presence of an aromatic solvent and a compound selected from the group consisting of 2,6-lutidine; N,N-dimethylaniline and 2,6-diethylpyridine at a temperature less than 25° C.

2. A process according to claim 1 wherein diphenylmethane diisocyanate is added to a solution of hydrogen cyanide and 2,6-lutidine in an aromatic solvent.

3. A process according to claim 2 wherein said solvent is toluene.

4. A process according to claim 1 wherein hydrogen cyanide, 2,6-lutidine, and toluene are added to a solution of diphenylmethane diisocyanate.

References Cited

Baker et al.: J. Chem. Soc., 1957, p. 4663.
Petersen, Ann. 562, p. 205 (c. 1949).
OKU et al.: Makromol Chem., 78, 186, 1964.

LORRAINE A. WEINBERGER, Primary Examiner

R. GERSTL, Assistant Examiner

U.S. Cl. X.R.

260—453 AR